United States Patent [19]

Misiano et al.

[11] Patent Number: 5,462,779
[45] Date of Patent: Oct. 31, 1995

[54] THIN FILM MULTILAYER STRUCTURE AS PERMEATION BARRIER ON PLASTIC FILM

[75] Inventors: Carlo Misiano; Enrico Simonetti, both of Rome; Francesco Staffetti, Torninparte, all of Italy

[73] Assignee: Consorzio Ce.Te.V. Centro Tecnologie del Vuoto, Carsoli, Italy

[21] Appl. No.: 25,514

[22] Filed: Mar. 2, 1993

Related U.S. Application Data

[63] Continuation-in-part of Ser. No. 956,736, Oct. 2, 1992, abandoned.

[51] Int. Cl.⁶ .......................... B32B 18/00; B32B 27/06; B32B 27/36; B32B 7/02
[52] U.S. Cl. ................ 428/34.7; 428/35.4; 428/36.6; 428/216; 428/335; 428/430; 428/446; 428/451; 428/480; 428/697; 427/255.3; 427/419.2; 427/527; 427/579; 427/588; 427/595
[58] Field of Search .................. 428/35.7, 35.8, 428/426, 469, 448, 480, 446, 472, 451, 34.4, 34.6, 34.7, 35.4, 36.7, 36.6, 215, 216, 337, 339, 335, 702, 697, 430; 427/255.3, 255.5, 255.2, 526, 527, 528, 574, 576, 578, 579, 583, 584, 588, 255.1, 419.2, 419.3, 595

[56] References Cited

U.S. PATENT DOCUMENTS

| | | | |
|---|---|---|---|
| 3,442,686 | 5/1969 | Jones | 117/70 |
| 4,552,791 | 11/1985 | Hahn | 428/35 |
| 4,702,963 | 10/1987 | Phillips et al. | 428/426 |
| 5,085,904 | 2/1992 | Deak et al. | 428/35.7 |
| 5,100,720 | 3/1992 | Sawada et al. | 428/215 |
| 5,107,791 | 4/1992 | Hirokawa et al. | 118/719 |

*Primary Examiner*—Paul J. Thibodeau
*Assistant Examiner*—Vivian Chen
*Attorney, Agent, or Firm*—Herbert Dubno

[57] ABSTRACT

A barrier coating against oxygen and water vapor penetration for a plastic packaging film comprising two oxides, one of which is $SiO_2$ while the other is $Al_2O_3$. The barrier is a single layer of mixed oxides in which the concentration of $Al_2O_3$ increases continuously from 20% by weight to 80% by weight while the concentration of $SiO_2$ decreases continuously from 80% by weight to 20% by weight as the thickness of the mixed oxide layer increases from the surface of the plastic film. The plastic film is preferably polyethylene terephthalate or polyphenylene oxide and the barrier coating is transparent.

8 Claims, 2 Drawing Sheets

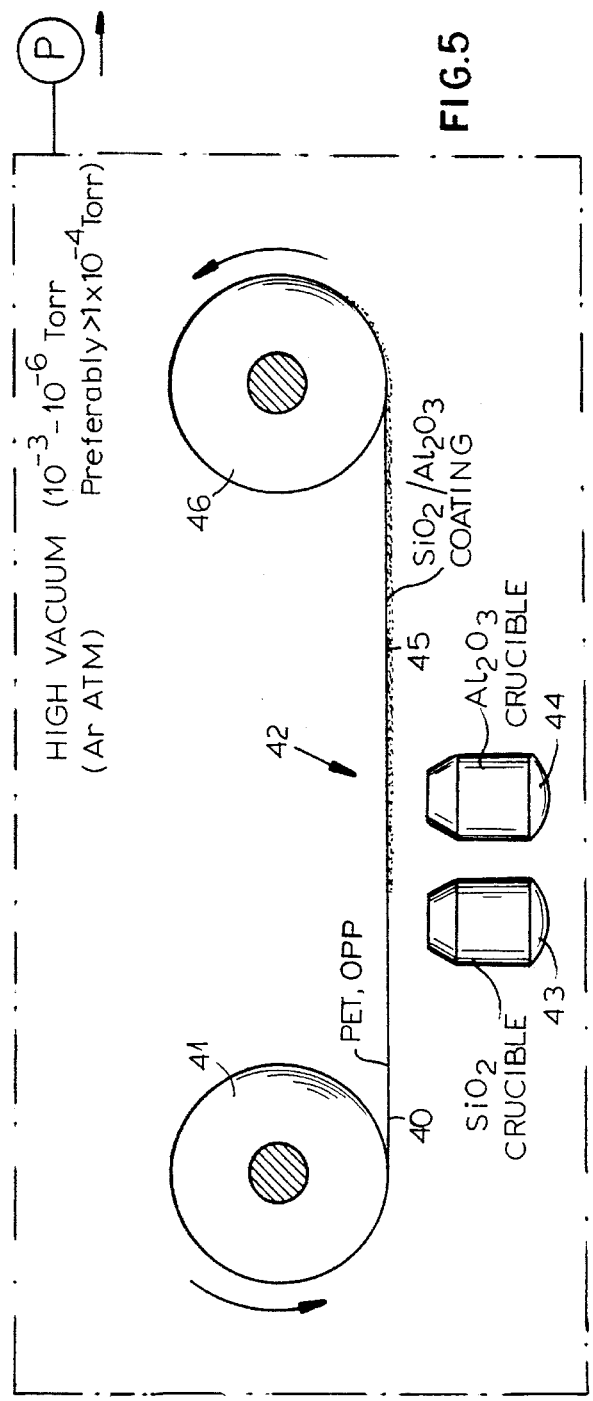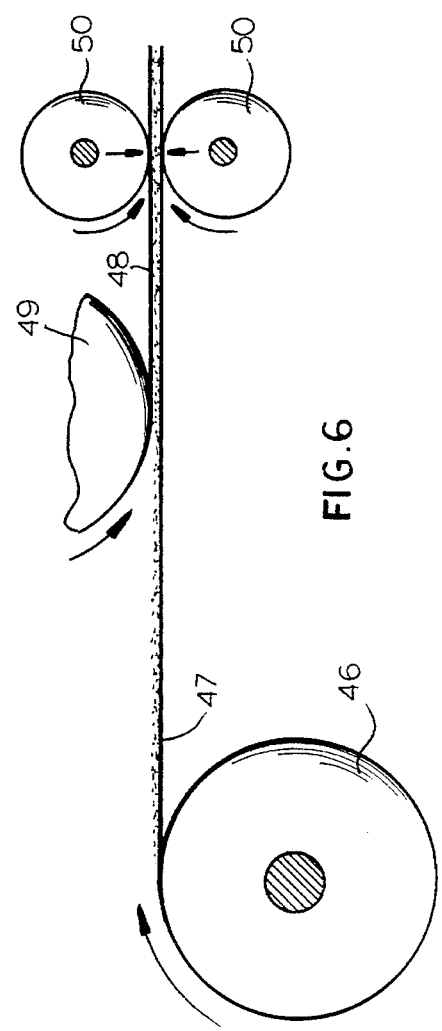

THIN FILM MULTILAYER STRUCTURE AS PERMEATION BARRIER ON PLASTIC FILM

CROSS REFERENCE TO RELATED APPLICATION

This application is a continuation-in-part of Ser. No. 07/956,736 filed 2 Oct. 1992 now abandoned.

FIELD OF THE INVENTION

The present invention relates to an improved gas and water vapor permeation barrier for plastic film, particularly for use in the food industry and, more particularly, to a wrapping film, package lining film or, in general terms, a food-packaging film having an improved barrier against penetration of gas, especially water vapor. The invention also relates to a method of making the improved packaging film.

BACKGROUND OF THE INVENTION

As the aforementioned application describes, prior plastic films employed for packaging can have barrier properties improved by the application of a metallic material, such as a coating of aluminum, or by the application of a dielectric material, namely, an oxide of silicon, i.e. SiO or $SiO_2$.

A variety of techniques have been employed for applying such barrier coatings, including thermal deposition, sputtering, plasma-enhanced chemical vapor deposition (PE-CVD), and electron-beam gun evaporation techniques (EBG).

With these earlier barrier layers, the barrier effectiveness appears to depend upon the deposition conditions, the adhesion of the film to the substrate and the compactness of the deposited film. Surprisingly, barrier performance is not significantly affected by a thickness of the deposited film. In other words, once a uniform and substantially continuous coating of the film is applied to establish the barrier, additional thicknesses or an increase in the thickness does not materially improve the barrier effectiveness.

With earlier systems for applying, especially dielectric films like SiO to a plastic film substrate, undesired coloring of the film resulted. More particularly, the application of SiO especially and to some extent $SiO_2$ resulted in a yellowing of the plastic film as could be measured by absorption in the violet region of the visible light range on the coated film. The yellowing of the plastic film reduced the desirability thereof as a packaging film, in spite of the fact that the dielectric barrier coating did materially improve the resistance of the film to the passage of gasses such as oxygen and vapors such as water vapor therethrough.

OBJECTS OF THE INVENTION

It is the principal object of the present invention to improve upon the system described in our above-mentioned copending application.

Another object of this invention is to provide a plastic film for food packaging and the like which has improved transparency and is not discolored in spite of the fact that it has a barrier layer thereon, which is inexpensive to make and which has improved resistance to permeation by gas and vapor, especially by oxygen and water vapor.

Still another object of this invention is to provide an improved barrier coating for plastic film which has a high degree of stability, i.e. is not significantly affected as to its barrier properties, by repeated flexing representing folding, wrinkling and other manipulation of the plastic film.

It is also an object of this invention to provide an improved method of making a plastic film with excellent barrier properties and a particularly satisfactory appearance.

SUMMARY OF THE INVENTION

These objects and others which will become apparent hereinafter are attained, in accordance with the invention by applying a thin coating of at least one substance selected from the group which consists of SiO and $SiO_2$, and, as another substance, $Al_2O_3$ to a plastic film by any of the techniques described previously and suitable for the application of dielectric coatings to such film.

The coating may be formed as a single layer.

In the case in which the silicon oxide and aluminum oxide materials are codeposited in a single layer, that layer may have uniform distribution of the two oxide components throughout its thickness but preferably has a gradient of one component from a low concentration to a high concentration across the thickness while the concentration of the other component proceeds from a high concentration to a low concentration in the same direction.

The coating can be formed in a single production cycle or in multiple production cycles, e.g. in two or more passes. The two components, moreover, may be deposited by the same technique or by different techniques. For example, one of the components can be deposited by thermal evaporation while the other is deposited by PE-CVD.

Surprisingly, with the double-oxide coating of the invention, thickness does not play a role in the sense that increasing the thickness for a silicon oxide film alone by adding the aluminum oxide is not the basis for the improvement since the improvement is found with thicknesses of the double-oxide coating equal to or less than standard thicknesses of silicon oxide film.

The invention can use, therefore, any of the thicknesses of silicon oxide films which have been employed heretofore or can range in thickness between 20 and 500 Å.

More particularly, a packaging film according to the invention can comprise a substrate and a multilayer barrier coating on the substrate composed of at least two dielectric or metallic components, one of the components being selected from the group which consists of $SiO_2$, SiO and mixtures thereof, and another of the components being $Al_2O_3$.

More particularly, this film comprises a flexible plastic foil, and a substantially transparent flexible barrier coating on the foil reducing permeability thereof to gas and vapor, the coating consisting essentially of $SiO_2$ and $Al_2O_3$ uniformly deposited over a surface of the foil and adherent thereto.

The method of making the film can comprise the steps of:
applying to a flexible plastic foil a vacuum of substantially $10^{-3}$ to $10^{-6}$ Torr.; and
under the vacuum, coating the flexible plastic foil with a substantially transparent flexible barrier coating reducing permeability thereof to gas and vapor, the coating consisting essentially of $SiO_2$ and $Al_2O_3$ uniformly deposited over a surface of the foil and adherent thereto.

The improved barrier coating of the invention has been found to markedly increase the resistance to penetration of the film by gases and vapors and especially to oxygen and water vapor without coloring the film. The coating which is supplied is transparent and, surprisingly, improves the overall transparency of a transparent film because it appears to act as an antireflecting coating as well.

The coating in a single, double or multilayer can be carried out in a batch method although preferably a roll-to-roll coater is used with, as a source of the coating materials, crucibles upon which electron beam guns are trained for evaporating the components.

The resulting transparent and substantially colorless film with high barrier properties for oxygen and water vapor are particularly effective for the production of packaging film for food stuffs.

The coating process is preferably carried out at a vacuum in the range of $10^{-3}$ to $10^{-6}$ torr and preferably with a vacuum drawn more deeply than $5 \times 10^{-4}$ torr in the presence of an argon atmosphere The films which are coated can be any of the films commonly used for packaging and preferably are colorless and transparent film and which the most preferable are polyethyleneterephthalate (PET) and polyphenyleneoxide (PPO). The film thickness is determined by the packaging needs and we have found that thicknesses of 10 µm through 50 µm, preferably 13 µm–40 µm are most advantageous.

BRIEF DESCRIPTION OF THE DRAWING

The above and other objects, features and advantages of the present invention will become more readily apparent from the following description, reference being made to the accompanying drawing in which:

FIG. 5 is a diagram illustrating the method of the invention; and

FIG. 6 shows the lamination process in a diagrammatic side view.

SPECIFIC DESCRIPTION

Figure 1:
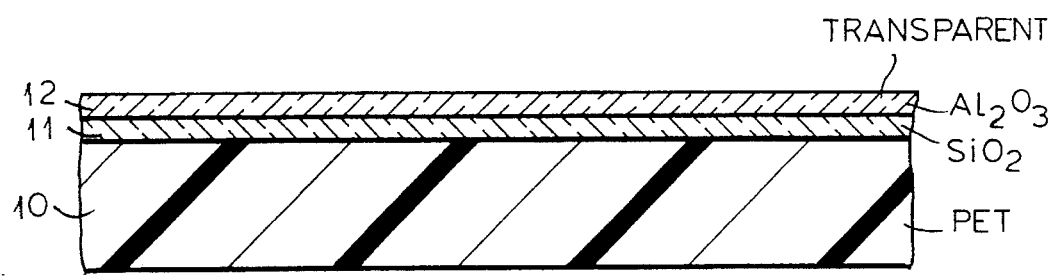
FIG. 1 is a cross sectional view through a double-layer coating on PET illustrative of one aspect of the invention.

In FIG. 1, we have shown, greatly exaggerated in both scale and dimension, a polyethyleneterephthalate film 10 to the surface of which has been applied a vapor deposited coating 11 of $SiO_2$ (or SiO) and a vapor-deposited coating 12 of $Al_2O_3$, the two coatings together forming the barrier layer which, like the PET film, can be entirely transparent. The coatings can be applied by any vapor deposition technique, including ion plating or plasma-enhanced chemical vapor deposition, crucible evaporation or electron-beam evaporation, or by sputtering.

Figure 2:
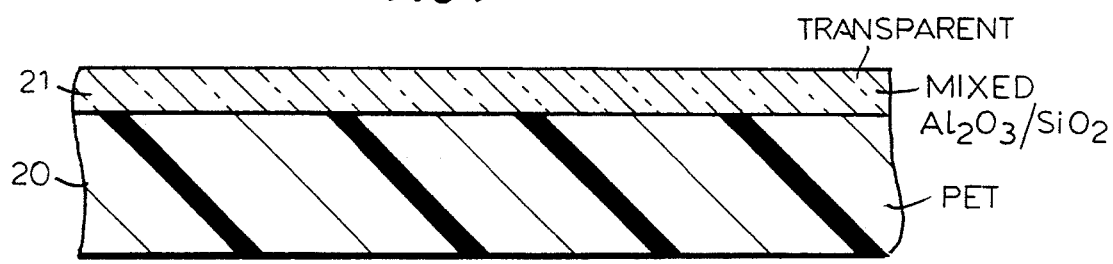
FIG. 2 is a cross sectional view through a single layer coating with mixed $Al_2O_3/SiO_2$ codeposited.
Figure 3:
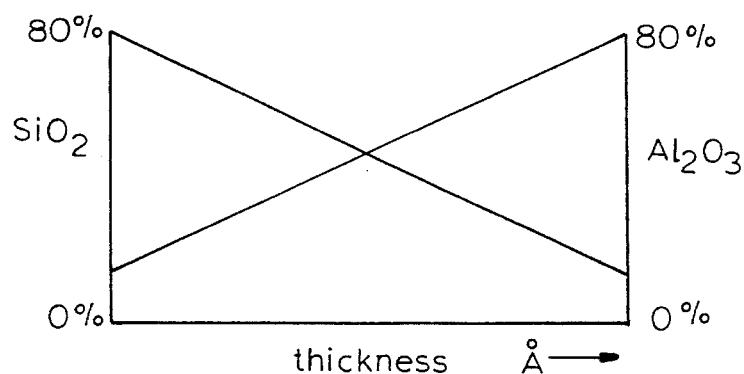
FIG. 3 is a graph showing a gradient for the components of this coating.

In FIG. 2, the film 20 is shown to have a single coating 21 thereon of both $Al_2O_3$ and $SiO_2$, preferably in a gradient from the surface of the PET which in the case of $Al_2O_3$ rises from about 20% by weight to about 80% by weight substantially linearly while in the case of $SiO_2$ decreases from about 80% by weight to about 20% by weight also linearly as the thickness of the layer increases (see FIG. 3).

Figure 4:
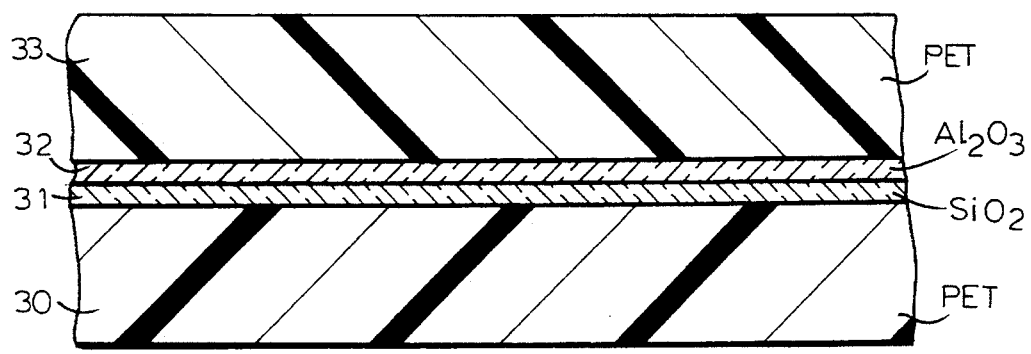
FIG. 4 is a section through a laminated foil in which the barrier is provided between two carrier foils.

In FIG. 4, we have shown a laminated film in which a substrate 30 of PET has the barrier coating made up of layers 31 and 32 thereon and to which is laminated by heat and pressure another PET layer 33.

From FIG. 5, it can be seen that the applicator can be a roll-to-roll coater in which the PET or polyphenyleneoxide film 40 is drawn from a roll 41 and is placed along a transport path 42 along which a surface of the film is coated with $SiO_2$ and $Al_2O_3$ from respective crucibles 43 and 44 upon which electron-beam guns may be trained, if desired, to promote the evaporation. The $SiO_2/Al_2O_3$ coating 45 is adherent to the film as it is wound up on a roll 46. If lamination is desired, the coated foil 47 is unwound from the roll 46 and a foil 48 is applied thereto from a roll 49 and the two foils are then passed between a pair of heated pressure rollers to bond the foils together (see FIG. 6).

SPECIFIC EXAMPLES

A polyethyleneterephthalate PET film of a thickness of 25 µm is coated by a roll-to-roll coater at a speed of about 2 m/sec using a Galileo Vacuum Tech electron beam evaporation coater with a 125 Kw Electron Beam Gun (Consarc). The vacuum was drawn in the coating chamber using two Turbomolecular pumps with a total pumping capacity of 50,000 l/sec to maintain a vacuum of at least $1 \times 10^{-4}$ Torr. during the coating process. Prior-art type coatings of $SiO_2$ and SiO were tested along with double oxide coatings of the present invention. The coating rate was sufficient in all cases to apply a completely uniform coating to a constant thickness. Surprisingly, the exact thickness was found to be relatively unimportant to the physical and barrier properties of the coatings obtained. Coatings were tested in the thickness range of 20 to 1,500 Å.

The uncoated film had an oxygen permeability ($O_2$ G.T.R.) of 4.5 ml/100 inch$^2$ dy and a water vapor permeability (W.V.T.R.) of 1.5 gr/100 inch$^2$ dy. The SiO coated film (comparative) had an oxygen permeability ($O_2$ G.T.R.) of 0.3 ml/100 inch$^2$ dy and a water vapor permeability (W.V.T.R.) of 0.11 gr/100 inch$^2$ dy, but had absorption bands in the violet part of the visible range conferring a yellowish cast thereto. The $SiO_2$ coated film (comparative) had an oxygen permeability ($O_2$ G.T.R.) of 0.95 ml/100 inch$^2$ dy and a water vapor permeability (W.V.T.R.) of 1.4 gr/100 inch$^2$ dy.

The double oxide barrier films having a layer of $SiO_2$ followed by a layer of $Al_2O_3$ (invention) and of equal parts by weight of $SiO_2$ and $Al_2O_3$ (invention) to the same overall thicknesses as the SiO and $SiO_2$ films had an oxygen permeability ($O_2$ G.T.R.) of 0.28 ml/100 inch$^2$ dy and a water vapor permeability (W.V.T.R.) of 0.01 gr/100 inch$^2$ dy and were transparent. In fact the transparency of the film to which the double oxide layers were applied had greater transparency than the uncoated film, showing that the double oxide coating functions as an antireflective layer.

The PET substrate coated with the double oxide layer was subjected to the Gelboflex test (full flex for 20 cycles at 440l angle, ASTM 0618) and showed a water vapor permeability (W.V.T.R.) of 0.29 gr/100 inch$^2$ dy.

A further double oxide layer was formed upon the same plastic film in a batch process using two electron beam guns to simultaneously deposit $SiO_2$ and $Al_2O_3$ under process conditions essentially the same as those given, except that in the deposited layer the $SiO_2$ concentration was linearly decreased to 20% from 80% and the $Al_2O_3$ concentration was linearly increased from 20% to 80% as the layer thickness increased. The test results were similar to those of the double oxide layers given above.

In the case of polyphenyleneoxide (OPP) film of the same thickness and coated under the same conditions, the uncoated film had an oxygen permeability ($O_2$ G.T.R.) of 130 ml/100 inch$^2$ dy and a water vapor permeability (W.V.T.R.) of 0.5 gr/100 inch$^2$ dy. The SiO coated film (comparative) had an oxygen permeability ($O_2$ G.T.R.) of 10 ml/100 inch$^2$ dy and a water vapor permeability (W.V.T.R.) of 0.08 gr/100 inch$^2$ dy, but had absorption bands in the violet part of the visible range conferring a yellowish cast thereto. The $SiO_2$ coated film (comparative) had an oxygen permeability ($O_2$ G.T.R.) of 13 ml/100 inch$^2$ dy and a water vapor permeability (W.V.T.R.) of 0.41 gr/100 inch$^2$ dy.

The double oxide barrier films having a layer of $SiO_2$ followed by a layer of $Al_2O_3$ (invention) and of equal parts by weight of $SiO_2$ and $Al_2O_3$ (invention) to the same overall thicknesses as the SiO and $SiO_2$ films had an oxygen permeability ($O_2$ G.T.R.) of 10.5 ml/100 inch$^2$ dy and a water vapor permeability (W.V.T.R.) of 0.09 gr/100 inch$^2$ dy and were transparent.

When the double oxide coating was applied by sputtering in the case of the PET film, the films had an oxygen permeability ($O_2$ G.T.R.) of 0.95 ml/100 inch$^2$ dy and a water vapor permeability (W.V.T.R.) of 1.04 gr/100 inch$^2$ dy and were transparent. When the double oxide coating was applied by sputtering in the case of the PPO film, the films had an oxygen permeability ($O_2$ G.T.R.) of 14 ml/100 inch$^2$ dy and a water vapor permeability (W.V.T.R.) of 0.42 gr/100 inch$^2$ dy and were transparent.

We claim:

1. A packaging and wrapping film, comprising a plastic foil, and a transparent barrier coating on said foil reducing permeability thereof to gas and vapor, said coating consisting essentially of $SiO_2$ and $Al_2O_3$ uniformly deposited over a surface of said foil and adherent thereto, said coating being formed in a single layer on said foil containing both $SiO_2$ and $Al_2O_3$, the concentrations of both $SiO_2$ and $Al_2O_3$ varying continuously across the entire thickness of said layer.

2. The packaging and wrapping film defined in claim 1, wherein the concentration of $Al_2O_3$ increases from 20% by weight to 80% by weight while the concentration of $SiO_2$ decreases from 80% by weight to 20% by weight as the thickness of said coating increases from the surface of said foil.

3. The packaging and wrapping film defined in claim 1 wherein said coating is a crucible-applied coating.

4. The packaging and wrapping film defined in claim 1 wherein said coating is an electron beam applied coating.

5. The packaging and wrapping film defined in claim 1 wherein said coating is a sputtering-applied coating.

6. The packaging and wrapping film defined in claim 1 wherein said coating is an ion plating applied coating.

7. The packaging and wrapping film defined in claim 1 wherein said coating is a chemical vapor deposited coating.

8. The packaging and wrapping film defined in claim 1 wherein said foil is a polyethylene terephthalate or polyphenylene oxide foil having a thickness between 10 μm and 50 μm.

* * * * *